(12) United States Patent
Duckstein

(10) Patent No.: US 10,086,758 B2
(45) Date of Patent: Oct. 2, 2018

(54) WEARABLE APPARATUS FOR USE BY A DRIVER OF A MOTOR VEHICLE

(71) Applicant: ELEKTROBIT AUTOMOTIVE GmbH, Erlangen (DE)

(72) Inventor: Franz Duckstein, Oberasbach (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 149 days.

(21) Appl. No.: 14/926,161

(22) Filed: Oct. 29, 2015

(65) Prior Publication Data

US 2016/0152185 A1 Jun. 2, 2016

(30) Foreign Application Priority Data

Nov. 27, 2014 (DE) .......................... 10 2014 017 599

(51) Int. Cl.
  *B60R 1/00* (2006.01)
  *H04N 5/64* (2006.01)
  *H04N 7/18* (2006.01)

(52) U.S. Cl.
  CPC .......... *B60R 1/00* (2013.01); *B60R 2300/207* (2013.01); *B60R 2300/301* (2013.01); *B60R 2300/305* (2013.01); *B60R 2300/406* (2013.01)

(58) Field of Classification Search
  CPC ............... B60R 1/00; B60R 2300/207; B60R 2300/301; B60R 2300/305; B60R 2300/406
  USPC ....................................................... 348/148
  See application file for complete search history.

(56) References Cited

U.S. PATENT DOCUMENTS

| | | | |
|---|---|---|---|
| 2005/0046953 A1 | 3/2005 | Repetto et al. | |
| 2010/0253543 A1* | 10/2010 | Szczerba | B60Q 9/005 340/932.2 |
| 2014/0253419 A1 | 9/2014 | Tanada | |
| 2016/0023602 A1* | 1/2016 | Krishnan | B60R 1/00 348/115 |
| 2016/0086491 A1* | 3/2016 | Choi | G08G 1/205 340/425.5 |

FOREIGN PATENT DOCUMENTS

| | | |
|---|---|---|
| DE | 198 11 161 A1 | 9/1999 |
| DE | 102 26 278 A1 | 12/2003 |

(Continued)

OTHER PUBLICATIONS

Office Action dated Nov. 8, 2016, issued in counterpart Japanese Patent Application No. 2015-196406, with Partial English translation. (11 pages).

*Primary Examiner* — Francis G Geroleo
(74) *Attorney, Agent, or Firm* — Westerman, Hattori, Daniels & Adrian, LLP

(57) ABSTRACT

A wearable apparatus for use by a driver of a motor vehicle is provided. The apparatus comprises a communication device which is configured to communicate with a complementary communication device of the motor vehicle. The apparatus further comprises a display device and a processor device. The processor device is configured to receive, via the communication device, sensor-acquired data regarding an environment of the motor vehicle from the complementary communication device of the motor vehicle and to control the display device to display the received environment data or environment data derived therefrom.

13 Claims, 3 Drawing Sheets

(56) References Cited

FOREIGN PATENT DOCUMENTS

| | | |
|---|---|---|
| DE | 10 2004 060 776 A1 | 7/2006 |
| DE | 10 2007 002 258 A1 | 7/2008 |
| DE | 10 2008 034 606 A1 | 1/2010 |
| DE | 10 2011 121 285 A1 | 6/2013 |
| DE | 10 2012 005 277 B3 | 7/2013 |
| DE | 10 2012 200 721 A1 | 7/2013 |
| EP | 2 295 281 A1 | 3/2011 |
| JP | 2005-096750 A | 4/2005 |
| JP | 2005-204143 A | 7/2005 |
| JP | 2005-212709 A | 8/2005 |
| JP | 2011-109170 A | 6/2011 |
| JP | 2013-543979 A | 12/2013 |
| JP | 2014-197179 A | 10/2014 |
| KR | 10-1335344 B1 | 12/2013 |
| WO | 03/023801 A2 | 3/2003 |
| WO | 2012/068089 A1 | 5/2012 |

* cited by examiner

WEARABLE APPARATUS FOR USE BY A DRIVER OF A MOTOR VEHICLE

TECHNICAL FIELD

The present disclosure relates generally to the technical field of electronic assistance of a driver of a motor vehicle. It relates in particular to a wearable apparatus for use by a driver of a motor vehicle and to a method for using the apparatus.

BACKGROUND

At present, motor vehicles are being increasingly equipped with devices for electronic assistance of the driver. These devices are, for example, sensor devices, such as cameras and distance sensors which detect the environment of the motor vehicle and in doing so generate environment data.

The environment data is provided to the driver typically in the form of a visual display (e.g., a camera image) or in the form of an acoustic signal (e.g., in dependence on a distance to an obstacle in the environment of the motor vehicle). This data is customarily displayed by a display device which is fixedly integrated in the motor vehicle in the region of the instrument display or centre console.

Depending on the driving situation (e.g., forward driving or reversing, parking procedure), sensor devices arranged at different positions of the motor vehicle may be interrogated in order to adapt the environment data provided to the driver, for example, to the driving direction of the motor vehicle. However, in some driving situations (e.g., reversing) the driver typically changes the orientation of his/her viewing direction inside the motor vehicle. This may result in the display device, for displaying the environment data and fixedly integrated in the motor vehicle, not lying in the viewing direction, and thus lying outside the field of view, of the driver.

To avoid such disadvantages, a parking aid is described in published application DE 10 2011 121 285 A1. In this aid, obstacles are detected by sensor devices at least in an environment located at the front side and at the rear side of the motor vehicle. The environment data generated during this is displayed in dependence on the driving direction of the motor vehicle by means of a display device arranged in the region of the windscreen or by means of a display device arranged in the region of the rear window (e.g., a head-up display).

SUMMARY

An improved solution for electronic assistance of a driver of a motor vehicle is to be provided.

According to a first aspect, a wearable apparatus for use by a driver of a motor vehicle is provided. The wearable apparatus comprises a communication device which is configured to communicate with a complementary communication device of the motor vehicle, a display device and a processor device. The processor device is configured to receive, via the communication device, sensor-acquired data regarding an environment of the motor vehicle from the complementary communication device of the motor vehicle and to control the display device to display the received environment data or environment data derived therefrom.

The communication device may be configured for wireless communication at least with the complementary communication device of the motor vehicle. The communication may take place here, for example, via Bluetooth, WLAN, ultra-wideband or another wireless communication technology.

The display device may be a liquid crystal display. Alternatively thereto, another display system (e.g., OLEDs) may be provided.

The sensor-acquired environment data may be data of an external sensor. In particular, it may be data of a distance sensor and/or a camera of the motor vehicle.

The distance sensor may be configured to determine a distance between the motor vehicle and an obstacle. For example, a distance sensor based on ultrasound, on radar or on light in the infrared (IR) wavelength range (approx. 700 nm to 1100 nm) may be provided. Distance data acquired by the distance sensor may be displayed in the form of numerical values (e.g., absolute values) or in the form of a graphical element (e.g., in the form of a bar variable in size) by means of the display device. The camera may be configured to detect light in the visible wavelength range (approx. 300 nm to 700 nm) and/or to detect IR light. Provision may be made to display a camera image detected by the camera, additionally or alternatively to the distance data, by means of the display device. Furthermore, provision may be made for the processor device of the apparatus and/or a processor device of the motor vehicle to be configured to process (e.g., to aggregate) environment data. The processed environment data may be displayed by means of the display device.

Regarding the environment of the motor vehicle, an environment located at the rear side, at the front side and/or laterally of the motor vehicle may be provided. In this case, the environment may include in particular a traffic space located at the rear side, at the front side and/or laterally of the motor vehicle. Provision may be made for the sensor-acquired environment data to be environment data regarding the environment located at the rear side of the motor vehicle.

The processor device may be configured to request and/or receive data which indicates a driving direction of the motor vehicle. The data indicating the driving direction of the motor vehicle may indicate an engaged gear or be derived therefrom. For this purpose, the processor device may be configured, for example, to communicate with a gearbox sensor arranged in the motor vehicle. The gearbox sensor may be provided to detect the gear engaged by the driver or the gear engaged in an automated manner (automatic transmission).

Alternatively or additionally thereto, the data indicating the driving direction of the motor vehicle may indicate an orientation of the driver inside the motor vehicle or be derived therefrom. In this case, the apparatus may comprise a device which is configured to detect the orientation of the driver inside the motor vehicle. Provision may be made for the orientation detection device to be configured to determine an orientation of the apparatus inside the motor vehicle. This may take place by interaction with at least one complementary orientation detection device arranged in the motor vehicle. The at least orientation detection device may comprise, for example, electrical contact surfaces, functional units of a (e.g., inductive) proximity sensor or an inertial sensor. The inertial sensor may comprise at least one translation sensor and/or at least one gyroscopic sensor.

The apparatus may further comprise a detection device which is configured to detect a user input. The detection device may, for example, be integrated with the display device in the manner of a touch-sensitive screen. Alternatively or additionally thereto, the detection device may have one or more mechanical operating elements. These elements may be buttons, switches, slide controls or other operating elements to be operated mechanically. Furthermore, the detection device may comprise a microphone for detecting an acoustic user input and/or the inertial sensor for detecting a movement executed by the apparatus.

Provision may be made for the processor device to be configured to control the display device to display the received environment data or the environment data derived therefrom when the data indicating the driving direction of the motor vehicle indicates a reversing. Furthermore, for active (e.g., performed by the driver of the motor vehicle) control of the display, provision may be made for the processor device to be configured to control the display device to display the received environment data or the environment data derived therefrom, based on the user input, selectively regarding an environment located at the rear side and/or the front side and/or laterally of the motor vehicle. Thus, the display device may be controlled, for example in a reverse parking procedure, to display the environment located at the rear side and, in at least some embodiments, laterally of the motor vehicle. This driving may take place in response to a user input or automatically (e.g., in dependence on the detected or desired driving direction).

The processor device may further be configured to control the communication device based on the user input to request and/or receive the data regarding an environment of the motor vehicle. Alternatively thereto, the processor device may be configured to request and/or receive data regarding an environment of the motor vehicle via the communication device, as soon as the apparatus is situated within a range of the complementary communication device of the motor vehicle.

The apparatus may be configured to be wearable on the wrist or on the arm of the driver. Thus, the apparatus may comprise a housing and also an arrangement by which the apparatus is wearable by the driver on the wrist or on the arm. The display device, the processor device and the communication device may be accommodated in the housing. The arrangement for wearing the apparatus may be, for example, a strap (e.g., wrist strap) or a garment.

The apparatus may be a smartwatch. The smartwatch may be used inside and/or outside the motor vehicle in the manner of a conventional watch.

According to a second aspect, a system is provided. The system comprises the apparatus, presented here, wearable by a driver of the motor vehicle and a motor vehicle which comprises a sensor device for acquiring data regarding an environment of the motor vehicle, and a communication device. According to a third aspect, a method for using a wearable apparatus by a driver of a motor vehicle is provided, wherein the apparatus comprises a communication device and a display device. The communication device is configured to communicate with a complementary communication device of the motor vehicle. The method comprises the steps of receiving, via the communication device, sensor-acquired data regarding an environment of the motor vehicle from the complementary communication device of the motor vehicle and driving the display device to display the received environment data or environment data derived therefrom.

According to a fourth aspect, a computer program product is provided, which is stored on a computer-readable storage medium. The computer program product is operable to cause a processor device to carry out the method presented here.

BRIEF DESCRIPTION OF THE DRAWINGS

Further advantages, details and features of the solution described here will become apparent from the following description of exemplary embodiments and from the figures, in which.

DETAILED DESCRIPTION

Figure 1A:
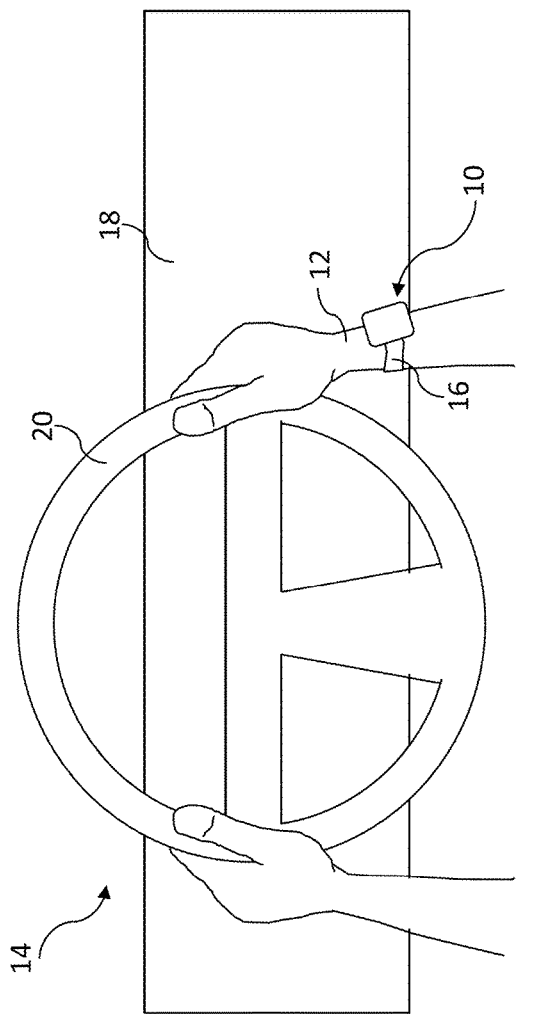
FIGS. 1A and 1B show schematic representations of an exemplary embodiment of an apparatus wearable by a driver of a motor vehicle.
Figure 1B:
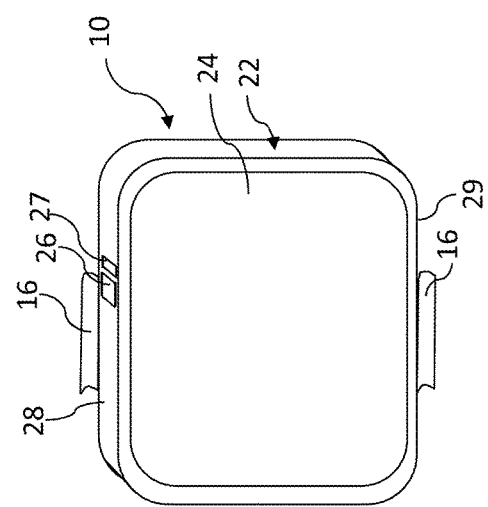

FIGS. 1A and 1B show schematic representations of an exemplary embodiment of an apparatus, generally designated by 10, which is wearable on the wrist or on the forearm of a driver 12 of a motor vehicle 14. In the exemplary embodiment shown, the apparatus 10 is releasably attachable in the region of a wrist of the driver 12 by means of a strap 16 extending starting from opposite lateral surfaces of the apparatus 10. Alternatively to this, provision may be made to attach the apparatus 10 in the region of the wrist or in the region of the forearm by means of a garment (e.g., on the sleeve of a shirt or of a jacket) worn by the driver 12. The apparatus 10 may be, for example, a smartwatch. The smartwatch may be used by the driver 12, for example, in the manner of a conventional watch and additionally for displaying driving-related data.

FIG. 1A shows a front view of a dashboard 18 of the motor vehicle 14. Mounted in front of the dashboard 18 is a steering wheel 20 of the motor vehicle 14, on which the driver 12 acts to steer the motor vehicle 14. In the exemplary embodiment shown, the apparatus 10 is arranged in the region of the right wrist of the driver 12 of the motor vehicle 14, as viewed in the direction of the front view. Alternatively to this, the apparatus 10 may be arranged in the region of the left wrist of the driver 12 or, for example, along one of the forearms of the driver 12.

FIG. 1B shows a perspective view of the apparatus 10 from the front. The apparatus 10 comprises a housing 22, at the front side of which a display device 24 is accommodated. In the exemplary embodiment shown, the front side of the housing 22 is configured in the shape of a rectangle with rounded corners. Alternatively to this, the front side of the housing 22 may be configured, for example, in the shape of an oval (including a circle) or of a polygon. The display device 24 may be a liquid-crystal panel, an OLED panel or another suitable display system.

In the exemplary embodiment shown in FIG. 1B, a mechanical operating element 26 and an electrical interface 27 are integrated in a lateral surface 28 of the housing 22. The mechanical operating element 26 is configured to detect a user input (performed, e.g., by the driver 12 of the motor vehicle 14). This element may be, for example, a button, a switch, a slide control or another element to be operated mechanically. The electrical interface 27 is configured to charge an accumulator (not shown) of the apparatus 10. In the exemplary embodiment shown, the electrical interface 27 is provided as part of an electrical plug-in connection. Alternatively or additionally thereto, the electrical interface 27 may be configured for wireless (e.g. inductive) energy transmission or in the manner of a solar cell for charging by means of sunlight. The charging of the accumulator may take place, alternatively or additionally thereto, by movement of the apparatus (e.g., by means of induction).

In another exemplary embodiment, the mechanical operating element 26 and/or the electrical interface 27 may be arranged on another section of the housing 22 of the apparatus 10 or be completely omitted. Moreover, further elements (not shown) may be integrated in the housing 22, such as, for example, an interface which is configured as an electrical contact surface, an interface for inserting a data carrier, a loudspeaker or a microphone.

In the exemplary embodiment shown in FIG. 1B, the strap 16 for releasable attachment of the apparatus 10 in the region of the wrist or of the forearm of the driver 12 (as shown in FIG. 1A) is arranged on the two opposite lateral surfaces 28, 29 of the housing which extend starting from two long edges of the front side of the housing 10 rearwards. In another exemplary embodiment the strap 16 may be arranged, for example, on the short lateral surfaces of the housing 22 which differ from the opposite long lateral surfaces 28, 29.

Figure 2:
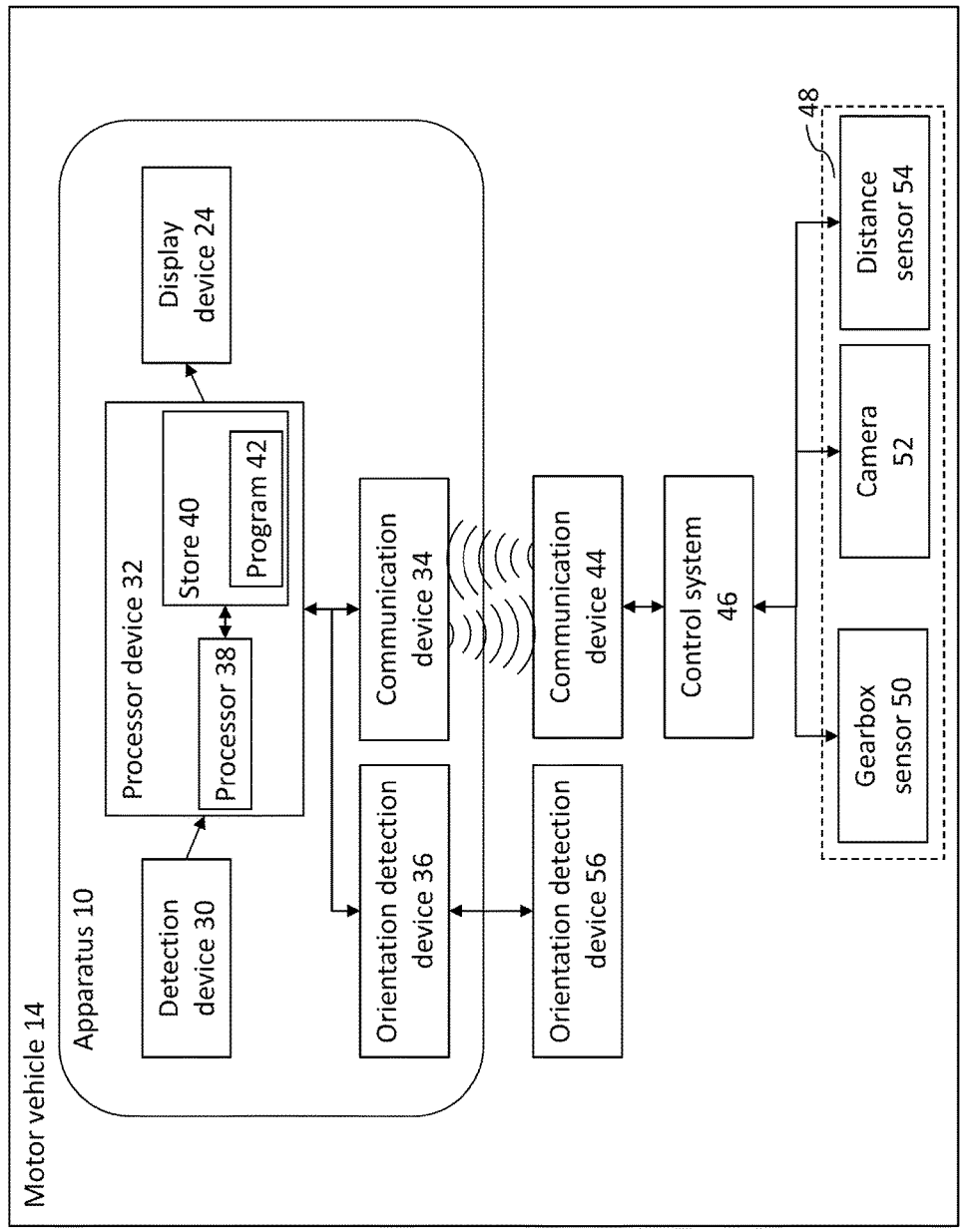
FIG. 2 shows a schematic representation of an exemplary embodiment of the apparatus according to FIGS. 1A and 1B for providing data regarding an environment of the motor vehicle.

FIG. 2 shows in a block diagram an exemplary embodiment of an apparatus 10 arranged in the motor vehicle 14. This may be the apparatus 10 as described with reference to the exemplary embodiment shown in FIGS. 1A and 1B.

The apparatus 10 according to FIG. 2 comprises a detection device 30, a processor device 32, the display device 24 (cf. the exemplary embodiment according to FIG. 1B), a communication device 34 and an orientation detection device 36. The detection device 30 is configured to detect a user input. The user input may take place, for example, by means of actuation of mechanical operating elements (as described with reference to the exemplary embodiment shown in FIG. 1B), by means of touching a touch-sensitive screen in the manner of a touch screen, by means of voice control via a microphone built into the apparatus 10 and/or by means of motion detection by an inertial sensor integrated in the apparatus 10. The detection device 30 is connected to the processor device 32, which is configured to evaluate the detected user input.

The processor device 32 comprises at least one processor 38 (e.g., a CPU) and a storage medium (store) 40. The store 40 is configured to store at least one computer program product (program) 42. The program 42 controls operations to be executed by the processor 38. The store 40 may be, for example, a hard-disk store, a removable store or a semiconductor store. The processor device 32 is configured to control (e.g. based on the detected user input) the display device 24, the communication device 34 and/or the orientation detection device 36.

The communication device 34 of the apparatus 10 communicates with a complementary communication device 44, arranged in the motor vehicle 14, by unidirectional or bidirectional data transmission. The data transmission according to FIG. 2 takes place bidirectionally and wirelessly, for example via Bluetooth, WLAN or ultra-wideband. The complementary communication device 44 of the motor vehicle 14 is coupled to a control system 46 of the motor vehicle 14.

Via the communication with the control system 46 of the motor vehicle 14, the processor device 32 of the apparatus 10 is configured to control sensor detection devices 48 of the motor vehicle 14 and/or receive data from the sensor detection devices 48. In the exemplary embodiment shown, the sensor detection devices 48 are a gearbox sensor 50, a camera 52 and a distance sensor 54. Alternatively or additionally thereto, the motor vehicle 14 may comprise further sensor detection devices 48 (e.g., further cameras 52 and/or further distance sensors 54). Provision may furthermore be made for the processor device 32 to be configured to read out further motor vehicle system functions (e.g. a speedometer) via the communication with the control system 46 of the motor vehicle 14.

The gearbox sensor 50 is configured to detect a gear of the motor vehicle 14 engaged by the driver or in an automated manner (automatic transmission). The camera 52 and the distance sensor 54 are configured to acquire environment data of the motor vehicle 14. Depending on the arrangement of the environment data sensor 52, 54 on the motor vehicle 14, the data here is data regarding an environment located at the rear side, at the front side and/or laterally of the motor vehicle 14. The environment here may be, in particular, a traffic space surrounding the motor vehicle 14.

The camera 52 is configured to detect electromagnetic waves. Provision may be made here for the camera 52 to be configured to detect light in the visible wavelength range (approx. 300 nm to 700 nm) and/or light in the infrared (IR) wavelength range (approx. 700 nm to 1100 nm). The camera 52 may comprise, for example, a CCD sensor (charge coupled device) and/or a CMOS sensor (complementary metal oxide silicon). The sensor may furthermore comprise a filter, in order to filter out light of a particular wavelength range (e.g. of the visible wavelength range). At least in this case, the camera 52 may comprise an image converter for visualising IR light. The distance sensor 54 is configured to detect a distance to an obstacle. As the distance sensor 54, for example a transmitter-receiver arrangement for ultrasonic waves or IR light may be provided.

The orientation detection device 36 of the apparatus 10 is configured to detect an orientation of the driver 12 inside the motor vehicle 14. Provision may be made here for the orientation of the driver 12 to be deduced from a determination of the position of the apparatus 10 wearable by the driver 12. For this purpose, in the exemplary embodiment shown in FIG. 2, the orientation detection device 36 is configured to interact with at least one complementary orientation detection device 56 arranged in the motor vehicle 14. The complementary orientation detection device 56 may be arranged, for example, in the region of the steering wheel 20 (cf. exemplary embodiment in FIG. 1A) and/or in the region of the driver's seat (or of the passenger's seat). The orientation detection devices 36, 56 may be electrical contact surfaces or functional units of a (e.g., inductive or capacitive) proximity sensor.

Alternatively or additionally thereto, the orientation detection device 36 may be configured to detect an orientation of the driver 12 inside the motor vehicle 14 without interacting with the complementary orientation detection device 56. Here the orientation detection device 36 of the apparatus 10 may be, for example, the inertial sensor. The inertial sensor may comprise at least one translation sensor and/or at least one gyroscopic sensor. Provision may be made for a predetermined movement of the apparatus 10 (e.g., from the region of the steering wheel 20 into the region of the driver's seat or of the passenger's seat) to be detected as a change in orientation.

Figure 3A:
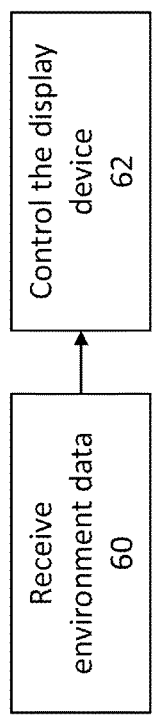
FIGS. 3A and 3B show flow diagrams of exemplary embodiments of a method for providing data regarding an environment of a motor vehicle.
Figure 3B:
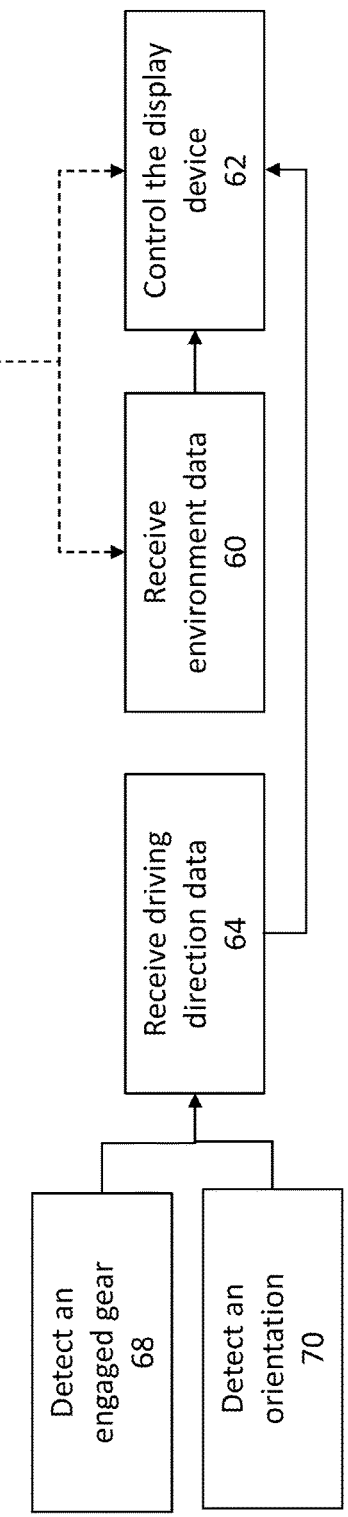

FIGS. 3A and 3B show flow diagrams of exemplary embodiments of a method for providing environment data of the motor vehicle 14. The method may be provided to be performed by the apparatus 10 in the motor vehicle 14 according to FIGS. 1A to 2.

According to the exemplary embodiment in FIG. 3A, environment data is received in a first method step 60. With reference to the exemplary embodiment in FIG. 2, the environment data is data sensor-acquired by the camera 52 and/or the distance sensor 54 regarding an environment of the motor vehicle 14. The data is requested and/or received by the processor device 32 by a communication with the control systems 46 of the motor vehicle 14. Provision may be made, for example, for the sensor-acquired environment data to be environment data regarding an environment located at the rear side of the motor vehicle 14. The processor device 32 may be configured to receive the environment data in an automated manner via the communication device 34, for example when the apparatus 10 is situated within range of the complementary communication device 44 of the motor vehicle 14.

In the following method step 62, the display device 24 (cf. FIGS. 1B and 2) is controlled to display the received environment data or environment data derived therefrom. Applied to the exemplary embodiment in FIG. 2, it is provided that the driving is performed by the processor device 32. Here provision may be made, for example, for the processor device 32 to control the display device 24 to display a camera image detected by the camera 52. Additionally or alternatively thereto, distance data acquired by the distance sensor 54 or distance data derived therefrom may be displayed in the form of numerical values (e.g., absolute values or relative values) or in the form of graphical elements (e.g., in the form of a bar variable in size) by the display device 24. The environment data derived therefrom may be environment data processed (e.g., aggregated) by means of the processor device 32 of the apparatus 10 or by means of a processor device of the motor vehicle 14. Here the processor device 32 of the apparatus 10 or the processor device of the motor vehicle 14 may be configured, for example, to determine the smallest distance from distance data acquired by a plurality of distance sensors 54 and/or to calculate a composite camera image from camera images detected by a plurality of cameras 52.

In addition to the method shown in FIG. 3A, the method according to FIG. 3B comprises the method steps of receiving driving direction data (step 64) and detecting a user input (step 66). To receive the driving direction data, in two further steps 68 and 70 there are detected a gear engaged in the motor vehicle 14 and an orientation of the driver 12 of the motor vehicle 14.

Applied to the exemplary embodiment in FIG. 2, the processor device 32 is configured to receive and/or request the driving direction data. For this purpose, the processor device 32 may communicate, for example via the communication with the control system 46 of the motor vehicle 14, with the gearbox sensor 50 which is configured to detect the engaged gear (step 68). In this case, the driving direction data may indicate a gear engaged in the motor vehicle 14 or be derived therefrom. Furthermore, a parking procedure, for example, may be detected when the gearbox sensor 50 detects a first forward gear or a reverse gear. Additionally or alternatively thereto, the processor device 32 may receive the driving direction data from the orientation detection device 36 which is configured to detect the orientation of the driver 12 (step 70). In this case, the driving direction data may indicate an orientation of the driver 12 in the motor vehicle 14 or be derived therefrom. From an orientation of the driver 12 in the direction of the rear-side environment of the motor vehicle 14, there may be deduced, for example, a reversing.

In the exemplary embodiment shown in FIG. 3B, the method step 62 of driving the display device 24 follows the receiving of the driving direction data (step 64). Here provision may be made, for example, for the processor device 32 according to FIG. 2 to control the display device 24 when the driving direction data indicates a reversing of the motor vehicle 14. It may further be provided that, in the case of a reversing, the received environment data (step 60) and/or the environment data displayed by means of step 62 on the display device 24, is environment data regarding the environment located at the rear side of the motor vehicle 14.

Alternatively or additionally thereto, in the method step 66 the user input is detected. With reference to the exemplary embodiments in FIGS. 1B and 2, the detection may take place by means of the mechanical operating element 26 and/or by means of the detection device 30. In the exemplary embodiment shown in FIG. 3B, the steps of receiving the environment data (step 60) and of driving the display device (step 62) are performed based on the detected user input. Applied to the exemplary embodiment in FIG. 2, the processor device 32 may be configured, based on the user input, to control the communication device 34 to communicate with the complementary communication device 44 to request and/or receive environment data.

Provision may furthermore be made for the processor device 32 to be configured to control (step 62) the display device 24 to display the received environment data or the environment data derived therefrom, based on the detected user input (step 66), selectively regarding an environment located at the rear side and/or at the front side and/or laterally of the motor vehicle 14 or to deactivate the display. Thus, provision may be made, for example, to activate and to deactivate the display of the rear-side environment by means of the user input. Provision may also be made to switch, by means of the user input, between the display of the front-side environment and the display of the rear-side environment (e.g., for a reverse parking procedure). Additionally or alternatively thereto, provision may be made to switch, by means of the user input, between the display of a rear-side environment and the display of the rear-side and of the lateral environment (e.g., for a reverse parallel parking procedure). In each of the above-mentioned cases, the activating/deactivating or the switching of the display may also take place automatically (for example in dependence on the detected or intended driving direction).

With reference to the embodiments described above, the apparatus 10 may be utilised for assisting the driver 12 of the motor vehicle 14. By attaching the apparatus 10 to the wrist or to the forearm of the driver, this apparatus is arranged in a viewing direction of the driver 12 both on forward driving of the motor vehicle 14 and on reversing of the motor vehicle 14. The environment data provided by means of the display device 24 for assistance lies in the intuitive field of view of the driver 12. The latter is thus not forced, particularly on reversing, to look away from the driving direction of the motor vehicle 14 in the direction of a display device, for example, fixedly integrated in the region of the dashboard 18. As a result of the environment data displayed in the viewing direction (e.g., camera image), moreover the driver's 12 understanding of the environment data is improved.

The exemplary embodiments described provide various features and use of a solution regarding the electronic assistance of a driver of a motor vehicle. In a different exemplary embodiment, these features may be combined or modified as desired.

The invention claimed is:

1. A wearable apparatus for use by a driver of a motor vehicle, comprising:
   a communication device which is configured to communicate with a complementary communication device of the motor vehicle;
   a display;
   a detection device which is configured to detect a user input;

an orientation detection device which is configured to detect an orientation of the driver inside the motor vehicle; and a processor which is configured to:
receive, via the communication device, sensor-acquired environment data regarding an environment of the motor vehicle from the complementary communication device of the motor vehicle;
control the display to display the received environment data or information derived from the received environment data, based on the user input, selectively regarding an environment located at one or more of a rear side, a front side, a right side, and a left side of the motor vehicle;
receive orientation data indicating the orientation of the driver in the motor vehicle or being derived from the orientation of the driver in the motor vehicle; and
control the display to display, based on the orientation of the driver inside the motor vehicle, a camera image detected by a camera, additionally or alternatively to distance information,
wherein the user input identifies a selected direction out of the front side, the rear side, the right side, and the left side, and the processor controls the display to display the camera image detected by the camera of the selected direction additionally to the distance information of the selected direction when the orientation of the driver is directed to another direction other than the selected direction, and to display the camera image detected by the camera of the selected direction without the distance information when the orientation of the driver is directed to the selected direction.

2. The wearable apparatus according to claim 1, wherein the received environment data is data of at least one of a distance sensor and a camera of the motor vehicle.

3. The wearable apparatus according to claim 1, wherein the received environment data is data regarding the environment located at the rear side of the motor vehicle.

4. The wearable apparatus according to claim 1, wherein the processor is further configured to at least one of request and receive data which indicates a driving direction of the motor vehicle.

5. The wearable apparatus according to claim 4, wherein the data indicating the driving direction of the motor vehicle indicates an engaged gear or is derived from the engaged gear.

6. The wearable apparatus according to claim 4, wherein the data indicating the driving direction of the motor vehicle indicates an orientation of the driver inside the motor vehicle or is derived from the orientation of the driver inside the motor vehicle.

7. The wearable apparatus according to claim 4, wherein the processor is configured to control the display to display the received environment data or information derived from the received environment data when the data indicating the driving direction of the motor vehicle indicates a reversing.

8. The wearable apparatus according to claim 1, further comprising a detection device which is configured to detect a user input, wherein the processor is configured to control the communication device based on the user input to at least one of request and receive the data regarding an environment of the motor vehicle.

9. The wearable apparatus according to claim 1, further comprising:
a housing, in which the display, the processor and the communication device are accommodated; and an arrangement by which the apparatus is wearable by the driver of the motor vehicle on the wrist or on the arm.

10. The wearable apparatus according to claim 1, wherein the processor is further configured to control the display to display the received environment data or information derived from the received environment data when the orientation data indicates the orientation of the driver as being towards the rear side of the vehicle or is derived from the orientation of the driver as being towards the rear side of the vehicle.

11. A system, comprising:
a motor vehicle including a sensor acquiring environment data regarding an environment of the motor vehicle, and a first communication device; and
a wearable apparatus wearable by a driver of the motor vehicle, the wearable apparatus including:
a second communication device configured to communicate with the first communication device;
a display;
a detection device which is configured to detect a user input;
an orientation detection device which is configured to detect an orientation of the driver inside the motor vehicle; and
a processor which is configured to:
receive, via the communication device, sensor-acquired environment data regarding an environment of the motor vehicle from the complementary communication device of the motor vehicle;
control the display to display the received environment data or information derived from the received environment data, based on the user input, selectively regarding an environment located at one or more of a rear side, a front side, a right side, and a left side of the motor vehicle;
receive orientation data indicating the orientation of the driver in the motor vehicle or being derived from the orientation of the driver in the motor vehicle; and
control the display to display, based on the orientation of the driver inside the motor vehicle, a camera image detected by a camera, additionally or alternatively to distance information,
wherein the user input identifies a selected direction out of the front side, the rear side, the right side, and the left side, and the processor controls the display to display the camera image detected by the camera of the selected direction additionally to the distance information of the selected direction when the orientation of the driver is directed to another direction other than the selected direction, and to display the camera image detected by the camera of the selected direction without the distance information when the orientation of the driver is directed to the selected direction.

12. A method for using an apparatus wearable by a driver of a motor vehicle, wherein the apparatus comprises a communication device, a display, a detection device configured to detect a user input, and an orientation device configured to detect an orientation of the driver inside the motor vehicle, wherein the communication device is configured to communicate with a complementary communication device of the motor vehicle, the method comprising the steps of:
receiving, via the communication device, sensor-acquired environment data regarding an environment of the motor vehicle from the complementary communication device of the motor vehicle; and controlling the display to display the received environment data or information derived from the received environment data, based on the user input, selectively regarding an environment located at one or more of a rear side, a front side, a right side, and a left side of the motor vehicle;

receiving orientation data indicating the orientation of the driver in the motor vehicle or being derived from the orientation of the driver in the motor vehicle; and controlling the display to display, based on the orientation of the driver inside the motor vehicle, a camera image detected by a camera, additionally or alternatively to distance information, wherein the user input identifies a selected direction out of the front side, the rear side, the right side, and the left side, and said controlling controls the display to display the camera image detected by the camera of the selected direction additionally to the distance information of the selected direction when the orientation of the driver is directed to another direction other than the selected direction, and to display the camera image detected by the camera of the selected direction without the distance information when the orientation of the driver is directed to the selected direction.

13. A non-transitory computer-readable storage medium, storing a computer program operable to cause a processor to carry out the method according to claim 12.

* * * * *